(12) United States Patent
Huang et al.

(10) Patent No.: US 9,762,897 B2
(45) Date of Patent: Sep. 12, 2017

(54) CONIC SECTION CALIBRATION OBJECT FOR CALIBRATING IMAGE CAPTURING DEVICE

(71) Applicant: NATIONAL APPLIED RESEARCH LABORATORIES, Taipei (TW)

(72) Inventors: Chi-Hung Huang, Taipei (TW); Yung-Hsiang Chen, Taipei (TW); Wei-Chung Wang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 11 days.

(21) Appl. No.: 14/918,575

(22) Filed: Oct. 21, 2015

(65) Prior Publication Data

US 2017/0118464 A1 Apr. 27, 2017

(51) Int. Cl.
*H04N 17/00* (2006.01)
*G06T 7/80* (2017.01)
*G06T 7/70* (2017.01)

(52) U.S. Cl.
CPC ............. *H04N 17/002* (2013.01); *G06T 7/70* (2017.01); *G06T 7/80* (2017.01)

(58) Field of Classification Search
CPC ...... H04N 5/361; H04N 5/3575; H04N 5/378; H04N 9/045; G06T 5/001
See application file for complete search history.

(56) References Cited

U.S. PATENT DOCUMENTS

| 2009/0097039 A1* | 4/2009 | Kawasaki | .......... G01B 11/2509 356/603 |
| 2009/0190826 A1* | 7/2009 | Tate | .................... H04N 1/00002 382/153 |

\* cited by examiner

*Primary Examiner* — Twyler Haskins
*Assistant Examiner* — Fayez Bhuiyan
(74) *Attorney, Agent, or Firm* — Chih Feng Yeh; Huntington IP Consulting Co., Ltd.

(57) ABSTRACT

A concentric circle adjusting apparatus for a multiple image capturing device is disclosed, where a first and second correction angles for correcting a first and second image capturing devices are respectively calculated by a control device according to a link length of a standard link, a first angle, a second angle, a first distance, and a second distance, respectively, so that a first and second platforms are controlled according to the first and second control commands to rotate the first and second image capturing device by the first and second correction angles, respectively, whereby the efficacy of an increased visible range and a rapid calibration may be achieved.

12 Claims, 10 Drawing Sheets

|  | circle | ellipse | parabola | hyperbola |
|---|---|---|---|---|
| standard equation | $x^2+y^2=a^2$ | $\dfrac{x^2}{a^2}+\dfrac{y^2}{b^2}=1$ | $y^2=4ax$ | $\dfrac{x^2}{a^2}-\dfrac{y^2}{b^2}=1$ |
| parameter equation | $a\cos\theta, a\sin\theta$ | $a\cos\theta, b\sin\theta$ | $at^2, 2at$ | $a\sec\theta, b\tan\theta$ or $\pm a\cosh u, b\sinh u$ |

US 9,762,897 B2

CONIC SECTION CALIBRATION OBJECT FOR CALIBRATING IMAGE CAPTURING DEVICE

BACKGROUND OF THE RELATED ART

Technical Field

The present invention relates to a calibration object for calibrating an image capturing device, and particularly to a conic section calibration object for calibrating an image capturing device, and which may provide a plurality sets of projection distance information.

Related Art

In a task for taking a picture on a full range special scene, a plurality of image capturing devices are used together, so that image information for any positions within the space may be obtained. At this time, a calibration process has to be undertaken on the image capturing devices to ascertain the image capturing devices may get in cooperation to produce appropriate information. The calibration refers to a process for deducing some inner parameters and outer parameters of the image capturing devices. To perform the calibration task, a calibration object is disposed outside the image capturing devices, so that the inner and outer parameters may be obtained. The image capturing each have their positions and azimuth angles, and which are defined with a Cartesian coordinate system, since such coordination system may provide a system pointing characteristic for the image capturing devices with respect to the positions and the azimuth angles of the calibration object.

The inner parameters of the image capturing devices reflects a mapping relationship between a three dimensional target point in an image capturing device coordination system associated with the image capturing device and a two dimensional target image point corresponding thereto. On the other hand, the outer parameters of the image capturing devices refers to a rotational and shift relationship between a target point on a world coordinate system and an image capturing device coordination system. The common inner parameters of the image capturing devices include a focal distance and a position, a feature ratio of a pixel, a lens' distorted distortion projection center, and the like.

Generally, if the inner mechanism and the lens of the image capturing device does not vary in position, the inner parameters of the image capturing devices are fixed and not relevant to a disposition position of the image capturing devices. However, for the image capturing devices equipped with a zooming lens, the inner parameters, such as the focal distance, may vary with the different focal points. The outer parameters of the image capturing devices include the position and a photo-taking direction of the image capturing devices on the three dimensional coordination, including a rotation matrix and a shift matrix. As compared to the inner parameters, the outer parameters have the difference that their values are relevant to the disposition position and photo-taking direction of the image capturing devices, and thus they have to be re-calibrated again whenever the image capturing devices are moved once.

The conventional calibration object comprises a three dimensional calibration object, a two dimensional calibration object, and a one dimensional calibration object, and which are shown in FIG. 1A, FIG. 1B, and FIG. 1C, respectively.

For the calibration purpose, the three dimensional calibration object uses two or three flat surfaces perpendicular to one another or a flat object using a known and simple shift. This mechanism may achieve in a precise calibration result but require a precise mechanical shift platform, and is difficult to be applied onto a large range monitoring used image capturing devices.

The two dimensional calibration object has a pattern having a known distance, and such flat calibration object is used to calibrate the image capturing devices through a rotation and a shift of different directions, with only requiring a pattern having the calibration points printed out and pasted on a surface which may not be arbitrarily distorted. Thereafter, an image of the surface being subjected to the rotation and shift of different angles is taken and thus the parameters of the image capturing devices may be deduced. However, such calibration object has the main disadvantage that the calibration points information may not be observed when it is rotated to a certain angle.

A one dimensional calibration object has a know length, and may be used to evaluate the parameters of the image capturing devices by fixing one end while moving the other end of the calibration itself. When it is required to calibrate the outer parameters of a plurality of image capturing devices overlapping with each other, the calibration points have to be observed by a plurality of image capturing devices concurrently. However, it has the main disadvantage that it is required to fixed one end while move the other end to generate a plurality sets of calibration images.

The three dimensional type has a difficulty in real practice, while the one and two dimensional types suffers from a shading effect on the calibration points resulted from the flat surface. When the calibration object is rotated, different two of the calibration points may has a possibility of being shaded and thus lose its calibration effect.

In view of the above, it may be known that the prior art is still inherent with the issue of shading effect for the calibration used target points, and, therefore, a more ideal calibration mechanism for the image capturing devices is actually required.

SUMMARY

In view of the above shortcoming to be improved in the prior art, the present invention provides a conic section calibration object capable of effectively avoiding a shading effect on calibration points on the calibration object, which comprises a conic section calibration object and a plurality of calibration points. The conic section calibration object has a set of coordination on a polar/spherical coordination system, and the set of coordination is expressed by a radius and an angle. The plurality of calibration points are disposed on a surface of the conic section calibration object and selected from the polar coordination system each for a mapping relationship between a three dimensional target point in an image capturing device coordination system associated with the image capturing device and a two dimensional target image point corresponding thereto.

In an embodiment, the conic section calibration object includes a conical calibration object, a semi-circular calibration object, and a cylindrical calibration object.

In an embodiment, a plurality of target points are projected on the conic section calibration object.

In an embodiment, the conic section calibration object is made of a hollow metallic material.

In an embodiment, the conical calibration object includes a circular calibration object, an elliptical calibration object, a parabolic calibration object, and a hyperbola calibration.

By using the above technical means, the present invention may achieve the technical efficacy where an image of all possible calibration points may be acquired successfully, respectively.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Figure 1A:
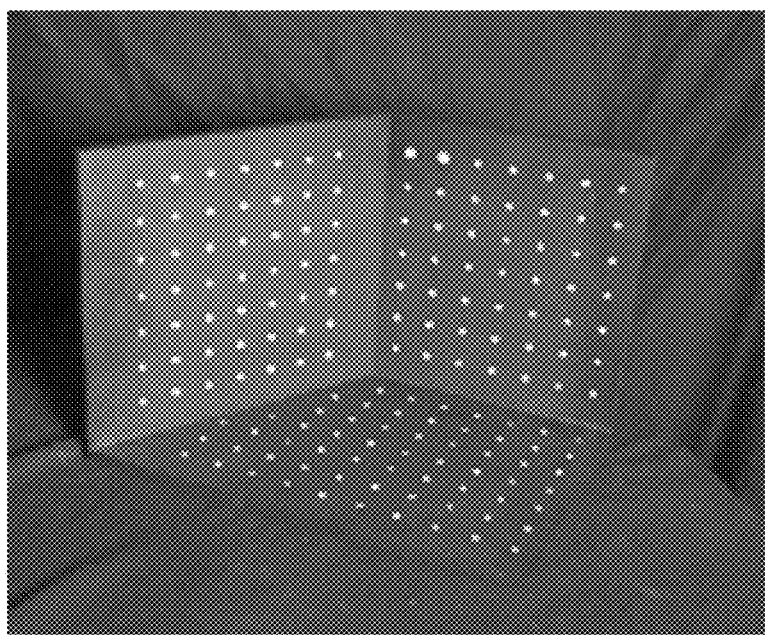
FIG. 1A, FIG. 1B, and FIG. 1C are a schematic diagram of a three dimensional calibration object, two dimensional calibration object, and one dimensional of a conventional capturing devices, respectively.
Figure 1B:
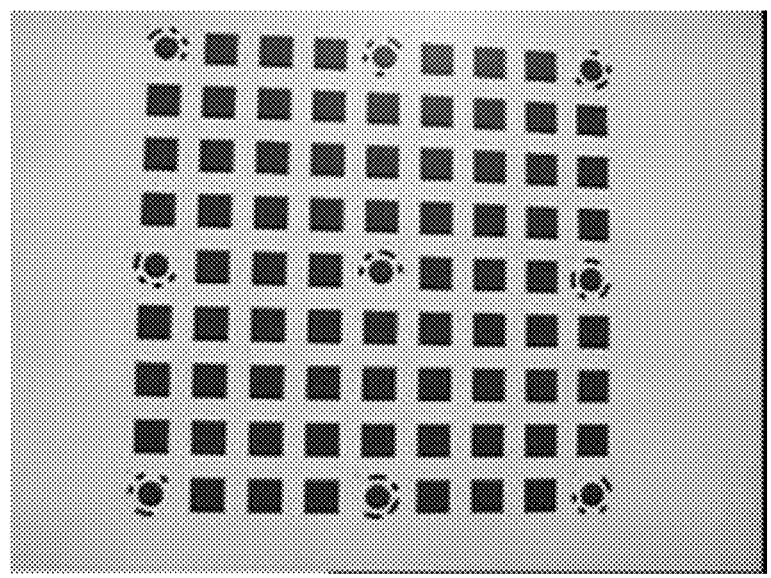
Figure 1C:
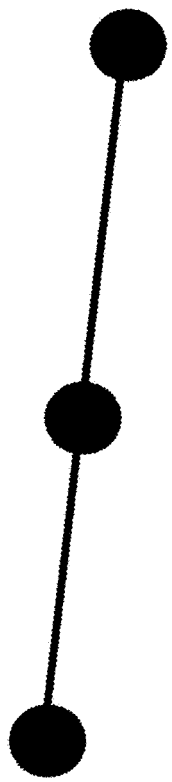
Figure 2A:
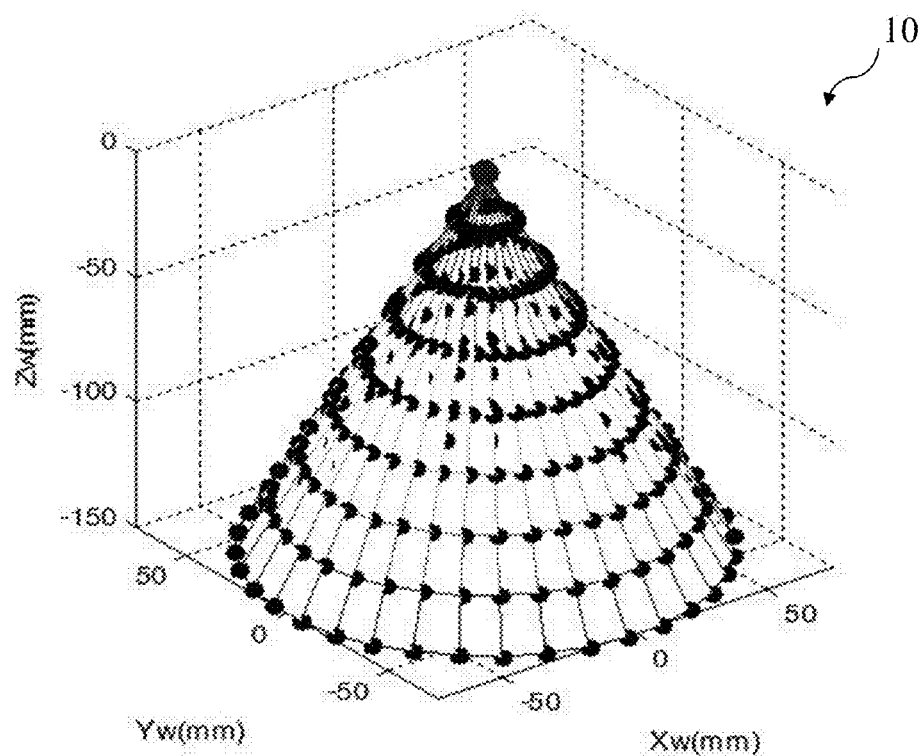
FIG. 2A, FIG. 2B, and FIG. 2C are a schematic diagram of a conical calibration object a semi-circular calibration object, and a cylindrical calibration object of a conic section calibration object according to the present invention, respectively.
Figure 2B:
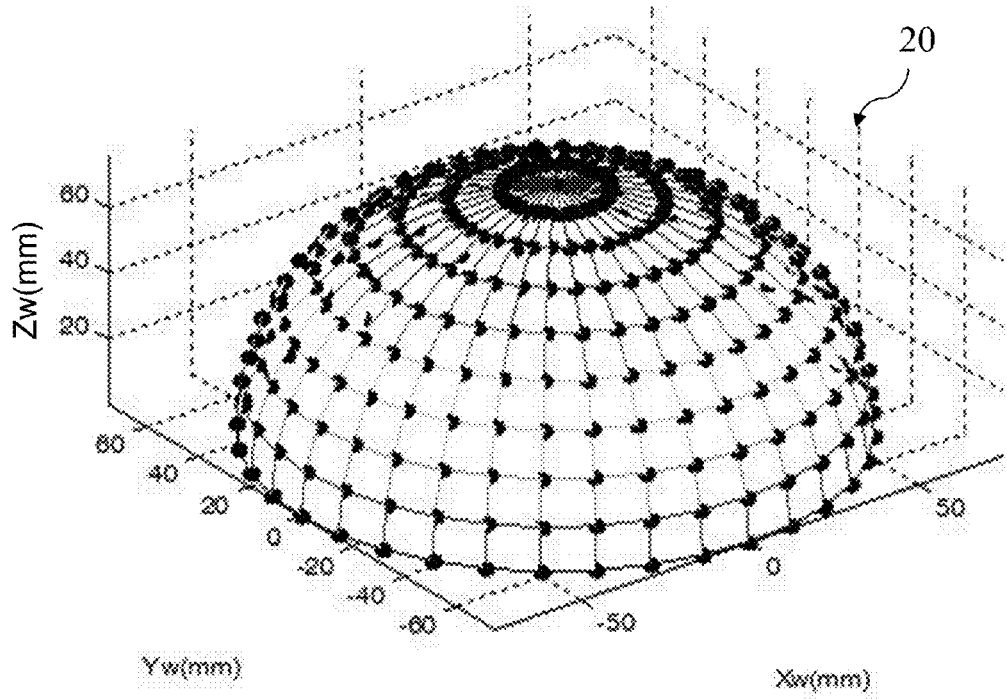
Figure 2C:
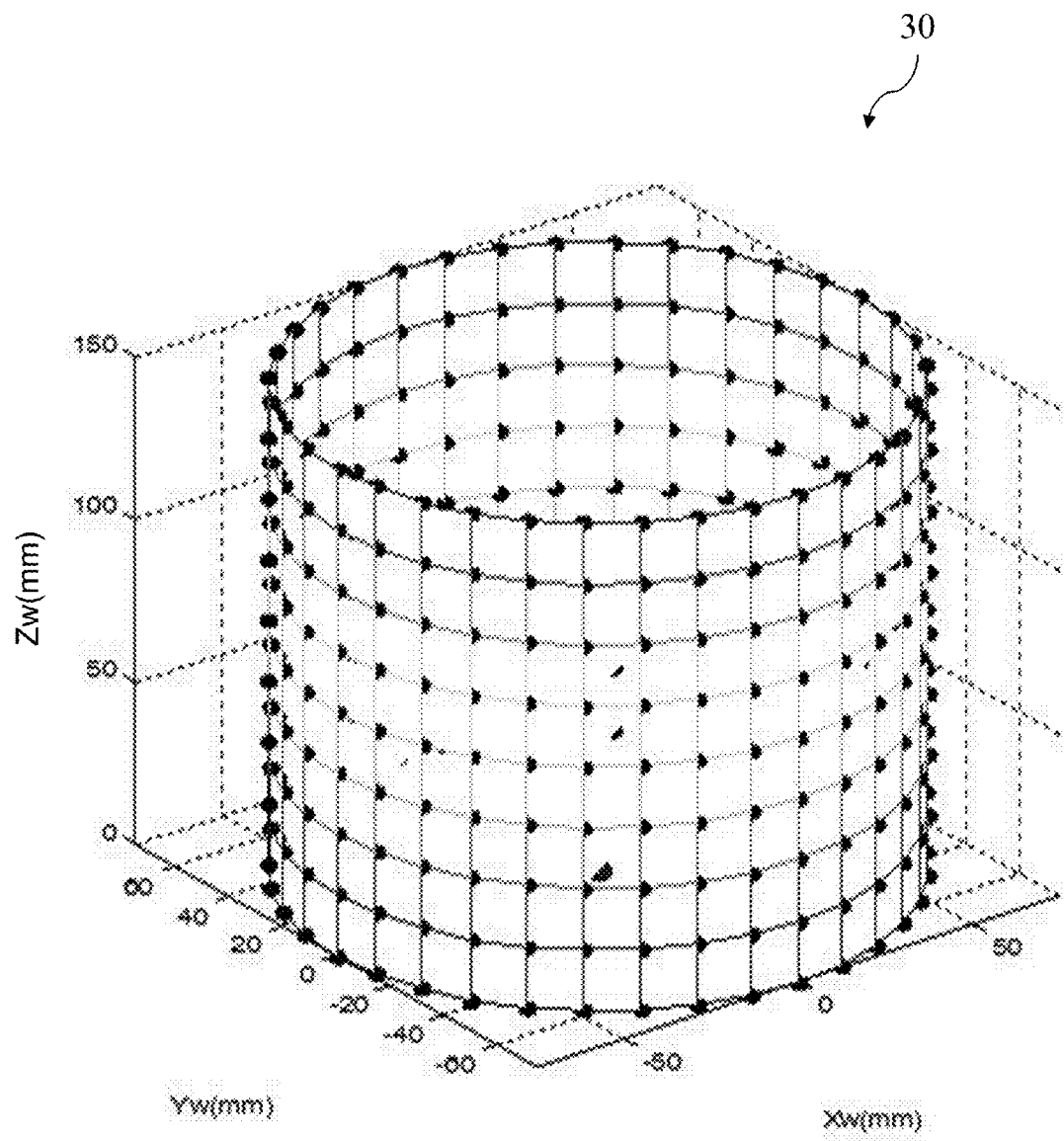
Figures 3A, 3B:
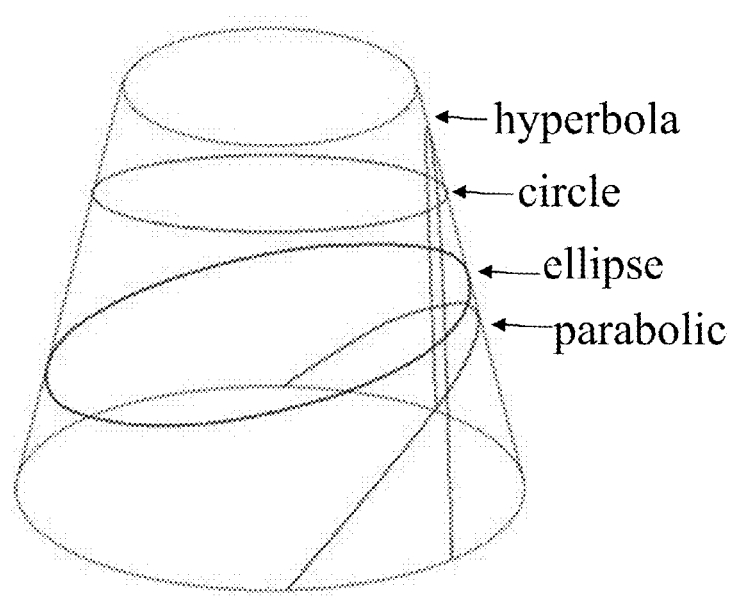
FIG. 3A, FIG. 3B, FIG. 3C, and FIG. 3D are a schematic diagram of a shape equation, a shape outlook, a planar surface associated presentation, and a shape's standard equation for various types of conical body, respectively.
Figure 3C:
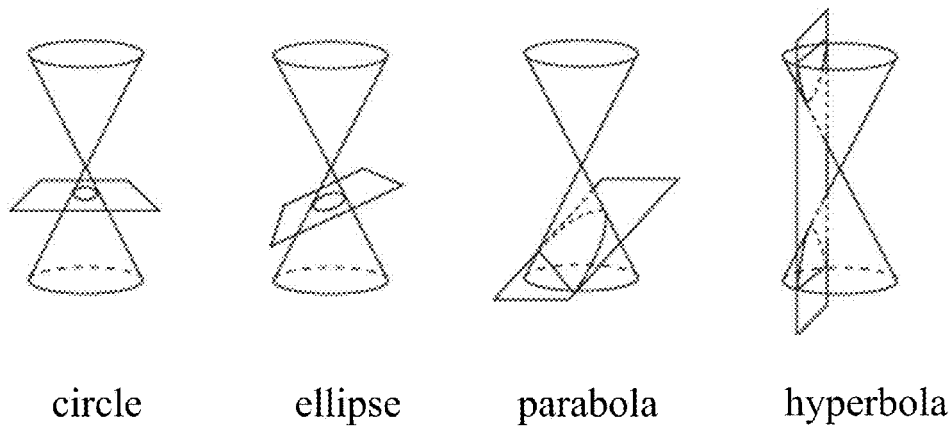
Figure 3D:
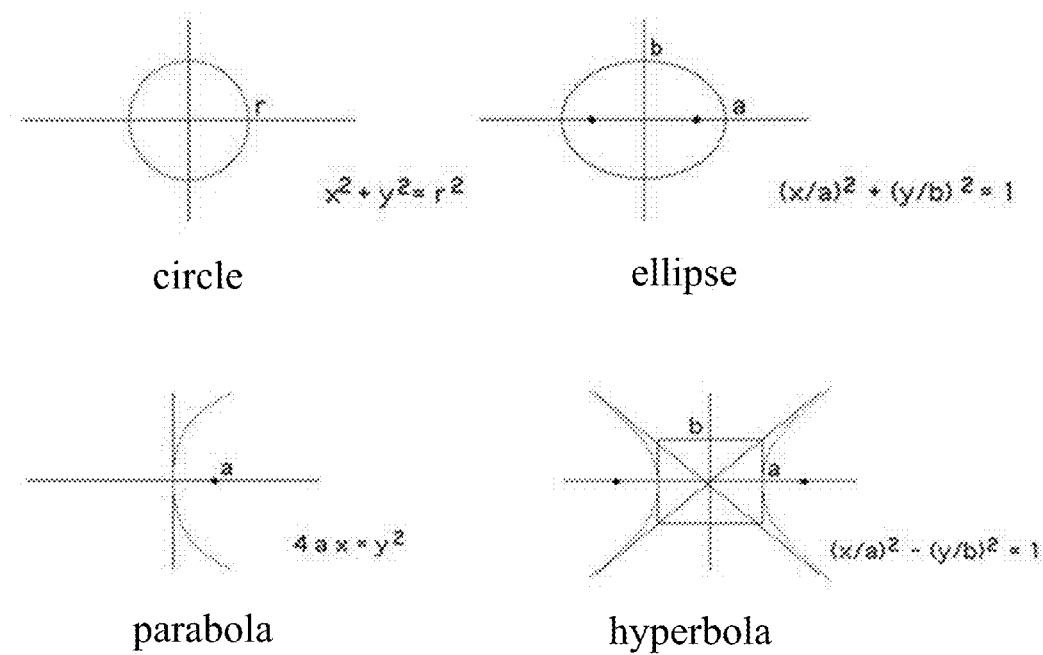

In the following, a conic section calibration object disclosed in the present invention will be first described. Referring to FIG. 2A through FIG. 2C, a schematic diagram of a conical calibration object 10, a semi-circular calibration object 20, and a cylindrical calibration object 30 of a conic section calibration object according to the present invention are shown therein, respectively. The conical, semi-circular, cylindrical calibration objects are various derivations in shape.

A conic section or a secondary curve is a cut-off curve obtained by a plane crossing a conical body in mathematic geometry, including a circle, an ellipse, a parabola, a hyperbola, and some degraded types, and which will be described in FIG. 3A, FIG. 3B, FIG. 3C, FIG. 3D are a schematic diagram of a shape equation, a shape outlook, a planar surface associated presentation, and a shape's standard equation for various types of conical body, respectively;

The conical calibration object 10, the semi-circular calibration object 20, and the cylindrical calibration object 30 each have the following coordination expressions in equations (1) and (2), and (1) and (3), respectively:

$$r=\sqrt{x^2+y^2},\ \theta=\tan^{-1}y/x,\ x=r\cos\theta,\ y=r\sin\theta \quad (1)$$

$$x=r\sin\theta\cos\phi\ r=\sqrt{x^2+y^2+z^2}$$

$$y=r\sin\theta\sin\phi,\ \theta=\cos^{-1}z/r \quad (2)$$

$$z=r\cos\theta\ \phi=\tan^{-1}y/x,\ \text{and}$$

$$x=r\cos\phi\ r=\sqrt{x^2+y^2}$$

$$y=r\sin\phi,\ \phi=\tan^{-1}y/x \quad (3)$$

$$z=z\ z=z.$$

Equation (1) is an expression of a polar coordination system. If an angle $\theta$, an only ray passing through a pole and forming an angle $\theta$ with respect to a polar axis may be depicted (the angle is defined from the polar axis rotting to the ray in a counterclockwise direction). If a real number r is given, a point having a distance r, an integer, to the pole. In the polar coordination system, a coordination (r, $\theta$) may only correspond to an only point, but each of the points may correspond to a plurality of coordinations.

For example, the coordinations (r, $\theta$), (r, $\theta$+2π), and (−r, $\theta$+π) may correspond to the same point. The pole has its coordination (0, $\theta$), wherein may be an arbitrary value. The polar coordination r and $\theta$ may be converted into a Cartesian coordination, and the Cartesian coordination (x, y) may also be converted into the polar coordination system by using equation (1).

Figures 4A, 4B:
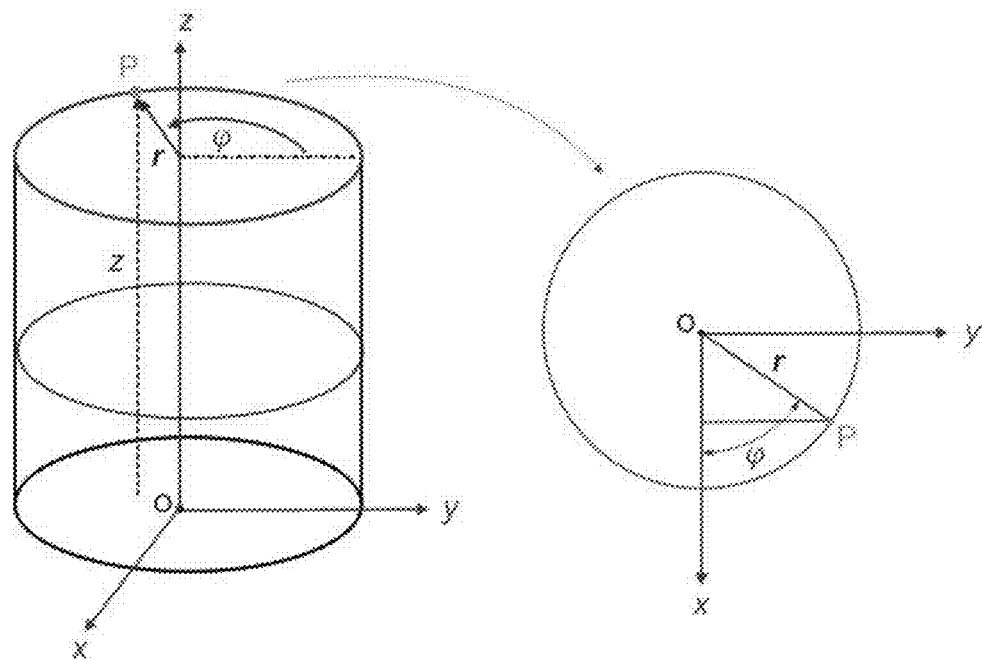
FIG. 4A and FIG. 4B are a side view and a vertical view of a cylindrical coordination system, respectively.

The equation (2) is an expression for the cylindrical coordination. The cylindrical coordination system (r, $\phi$, z) may be obtained from a conversion from the Cartesian coordination system (x, y, z), wherein r is a coordination value of a radius length (r≥0), i.e. the distance between point P and a central axis. $\phi$ is an angle's coordination value (0≤$\phi$≤2π), which is a counterclockwise rotation angle from the polar axis (X-axis). z is an altitude's coordination value, i.e. the distance between point P and a bottom surface, corresponding to a coordination value along Z-axis in Cartesian coordination system (−∞<z<∞). The cylindrical coordination system is shown in a side view and a top view in FIG. 4A and FIG. 4B, respectively.

Figures 5A, 5B:
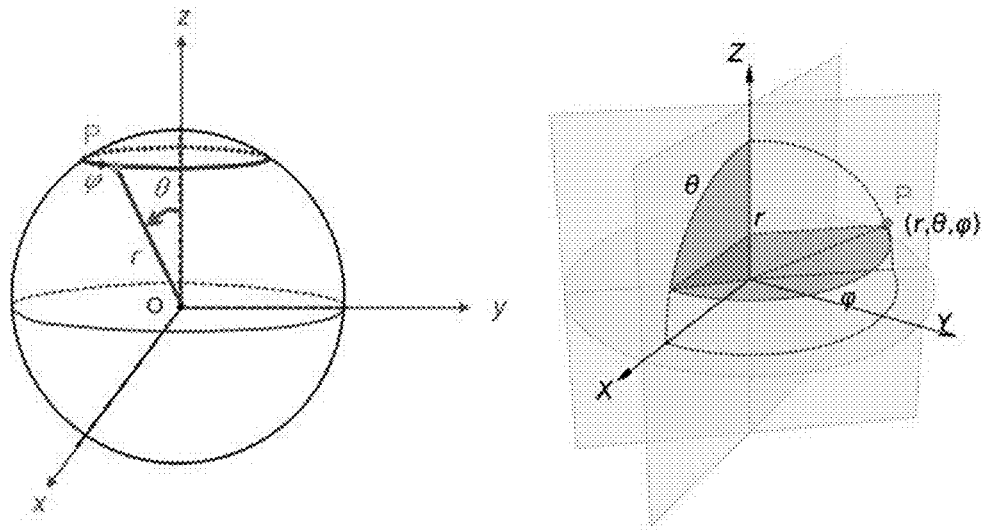
FIG. 5A and FIG. 5B are a side view and a vertical view of a spherical coordination system, respectively.

As known to general, the cone may be considered as part of a degradation of a sphere and thus viewed like in a spherical coordination system. In the spherical coordination system, point P is defined by two angles $\phi$, $\theta$ and the radius length r. The spherical coordination system (r, $\theta$, $\phi$) and the Cartesian coordination system (x, y, z) have the relationship as shown in Equation (3), wherein O is an original point, the coordination of r is a coordination value of the radius length, i.e. the distance between point P and a center of the coordination. $\phi$ is a coordination value (0≤$\phi$≤2π) of an azimuth angle, i.e. a rotational angle from X-axis in a counterclockwise direction. $\theta$ is a coordination value (0≤$\theta$≤π) of an elevation angle, i.e. a rotational angle from an XY plane upwards. The coordination system expressed the cone is shown in a side view and a top view in FIG. 5A and FIG. 5B.

In the following, how the conic section calibration object is used to deduce inner and outer parameters of an capturing device is described, and only a conical calibration object is described herein, with simultaneous reference to FIG. 2A. It is to be particularly pointed out that the image capturing device may be a camera for a preferred embodiment, and hence the nouns "image capturing device" and "camera" will be presented randomly through this specification.

The conical calibration object is described by using the following parameters: size: 150×150 mm, radius r: 75 mm, φ angle: every 10° one calibration point is marked (0°, 10°, ° e c360°—thirty six in total), diameter 8 mm for the calibration point, calibration point arrangement: an array with nine rows running along z-axis. According to equation (3), a calibration point on the conic calibration object has a 3D world coordination value (X, Y, Z) having a relationship with a 2D image coordination value (u, v):

$$\begin{bmatrix} u \\ v \\ 1 \end{bmatrix} = \begin{bmatrix} f_x & f_s & u_0 & 0 \\ 0 & f_y & v_0 & 0 \\ 0 & 0 & 1 & 0 \end{bmatrix} \begin{bmatrix} R_{3\times 3} & T_{3\times 1} \\ 0_{3\times 1} & 1 \end{bmatrix}_{4\times 4} \begin{bmatrix} X \\ Y \\ Z \\ 1 \end{bmatrix} = K[R \; T] \begin{bmatrix} X \\ Y \\ Z \\ 1 \end{bmatrix} \quad (4)$$

In Equation (4), $S_x$, and $S_y$ are a proportion constant along u and v axes, respectively, and which have a unit of pixels/unit length. $f_x$ and $f_y$ are a focal distance along u and v axes, respectively, and which have a unit of a pixel, respectively. $f_s$ is a skew factor for the angle θ between u and v axes. In ideal, θ=π/2 in simplification, then $f_s=fS_x$, $f_y=fS_y$, and $f_s=0$. When θ≠π/2, θ=π/2, $f_y=fS_y/\sin\theta$, $f_s=fS_x \cos\theta$, $u_0=-S_x(\hat{u}_0-\hat{v}_0\cot\theta)$, and $v_0=-S_y\hat{v}_0/\sin\theta°$ K is nine intrinsic parameters for the image capturing device, including f, $u_0$, $v_0$, $f_x$, $f_y$, and lens distortion parameters d($k_1$, $k_2$, $p_1$, $p_2$).

Consider a lens distortion parameter having a 5×1 matrix form, d($k_1$, $k_2$, $k_3$, $p_1$, $p_2$), used for presenting two distortion coefficient, a radial distortion and a tangential distortion for expressing a distorted extent of the image formed by a lens of the image capturing device, wherein positive and negative values represent a pincushion distortion or a barrel distortion, respectively. $k_1$, $k_2$, and $k_3$ represent the radius distortion, respectively. The schematic diagram illustrating the radial distortion is provided for expressing if the lens and a camera sensor are maintained parallel in the assembly process. $p_1$ and $p_2$ represent tangential distortion coefficient, respectively. From equations (5) and (6), the matrix may be deduced to obtain the distortion coefficients, and this deduction process is accompanied in a camera calibration process, wherein equations (5) and (6) are given as follows:

$$\begin{bmatrix} X_{radial} \\ Y_{radial} \end{bmatrix} = (1 + k_1 r^2 + k_2 r^4 + k_3 r^6) \begin{bmatrix} X \\ Y \end{bmatrix} \quad (5)$$

wherein (x, y) is a coordination value of any point on a plane without any distortion, ($X_{radial}$, $Y_{radial}$) is a coordination value after the radial distortion, $r^2=x^2+y^2$, $r^2$, $r^4$, and $r^6$ are obtained by taking r as a point in the case of an optical center distortion of zero and expanding the r by considering it as a Taylor's series.

$$\begin{bmatrix} x_{tangential} \\ y_{tangential} \end{bmatrix} = \begin{bmatrix} x \\ y \end{bmatrix} + \begin{bmatrix} 2p_1 xy + p_2(r^2 + 2x^2) \\ p_1(r^2 + 2y^2) + 2p_2 xy \end{bmatrix} \quad (6)$$

wherein (x, y) is a coordination value of any point on the plane before any distortion occurs, ($X_{tangential}$, $Y_{tangential}$) is a coordination value after the tangential distortion occurs, and $p_1$ and $p_2$ represent the tangential distortion coefficients, respectively.

Then, rearrange equation (5) regarding the radial distortion and equation (6) regarding the tangential distortion to deduce equation (7) representing a distortion image equation:

$$\begin{bmatrix} X_{distorted} \\ Y_{distorted} \end{bmatrix} = (1 + k_1 r^2 + k_2 r^4 + k_3 r^6) \begin{bmatrix} X \\ Y \end{bmatrix} + \begin{bmatrix} 2p_1 xy + p_2(r^2 + 2x^2) \\ p_1(r^2 + 2y^2) + 2p_2 xy \end{bmatrix} \quad (7)$$

Six R and T are the extrinsic parameter of n image capturing device, including three rotation matrixes (Ø, θ, φ) and three shift matrixes ($t_x$, $t_y$, $t_z$). $R_{3\times 3}$ and $T_{3\times 1}$ are a rotation matrix and a shift matrix, respectively, representing a rotational relationship between two coordination systems. R=(Ø, θ, φ) is a 3×3 rotation matrix, Ø, θ, and φ represent a tilt, a pan, and a swing angle. $T=[t_x,t_y,t_z]^T$ $T=[t_x,t_y,t_z]$ is a 3×1 shift matrix. $R_{3\times 3}$ and $T_{3\times 1}$ are respectively expressed as:

$$R_{3\times 3}\begin{bmatrix} r_{11} & r_{12} & r_{13} \\ r_{21} & r_{22} & r_{23} \\ r_{31} & r_{32} & r_{33} \end{bmatrix} = [r_1 \; r_2 \; r_3]_{3\times 3}, T = \begin{bmatrix} t_1 \\ t_2 \\ t_3 \end{bmatrix} = [t]_{3\times 1}. \quad (8)$$

Through a projection conversion matrix $P_{3\times 4}$ defined by equation (4), $P_{3\times 4}=K[R \; T]$ may be rewritten as $$\begin{bmatrix} u \\ v \\ 1 \end{bmatrix} \equiv sK[R \; T] \begin{bmatrix} X_w \\ Y_w \\ Z_w \\ 1 \end{bmatrix} = sK[r_1 \; r_2 \; r_3 \; t], \text{ and} \quad (9)$$

$$\begin{bmatrix} X_w \\ Y_w \\ Z_w \\ 1 \end{bmatrix} = H \begin{bmatrix} X_w \\ Y_w \\ Z_w \\ 1 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \begin{bmatrix} X_w \\ Y_w \\ Z_w \\ 1 \end{bmatrix}. \quad (10)$$

In the above, H is deduced by $$\begin{bmatrix} u \\ v \\ 1 \end{bmatrix} = H \begin{bmatrix} X_w \\ Y_w \\ Z_w \\ 1 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \begin{bmatrix} X_w \\ Y_w \\ Z_w \\ 1 \end{bmatrix} \quad (11)$$

$$\Rightarrow \begin{aligned} u &= \frac{h_{11}X_w + h_{12}Y_w + h_{13}Z_w + h_{14}}{h_{31}X_w + h_{32}Y_w + h_{33}Z_w + h_{34}} \\ v &= \frac{h_{21}X_w + h_{22}Y_w + h_{23}Z_w + h_{24}}{h_{31}X_w + h_{32}Y_w + h_{33}Z_w + h_{34}} \end{aligned}, \text{ and} \quad (12)$$

$$\Rightarrow \begin{aligned} h_{34}u &= h_{11}X_w + h_{12}Y_w + h_{13}Z_w + h_{14} - u(h_{31}X_w + h_{32}Y_w + h_{33}Z_w) \\ h_{34}v &= h_{21}X_w + h_{22}Y_w + h_{23}Z_w + h_{24} - u(h_{31}X_w + h_{32}Y_w + h_{33}Z_w) \end{aligned}. \quad (13)$$

Let $h_{34}=1$, Equation (13) may be expressed by a matrix as:

$$\begin{bmatrix} u \\ v \end{bmatrix} = \begin{bmatrix} X_w & Y_w & Z_w & 1 & 0 & 0 & 0 & 0 & -uX_w & -uY_w & -uZ_w \\ 0 & 0 & 0 & 0 & X_w & Y_w & Z_w & 1 & -vX_w & -vY_w & -vZ_w \end{bmatrix} \begin{bmatrix} h_{11} \\ h_{12} \\ h_{13} \\ h_{14} \\ h_{21} \\ h_{22} \\ h_{23} \\ h_{24} \\ h_{31} \\ h_{32} \\ h_{33} \end{bmatrix}. \quad (14)$$

Through a relationship equation, expressing a world coordination value $(X_w, Y_w, Z_w)$ associated with the calibration point on the conical calibration object and a 2D image coordination value $(u, v)$, n sets of measurement values of the calibration points are used in the above equation, H may be deduced by:

$$\begin{bmatrix} u_1 \\ u_1 \\ u_2 \\ u_2 \\ \vdots \\ \vdots \\ u_x \\ u_x \end{bmatrix} = \begin{bmatrix} X_{w1} & Y_{w1} & Z_{w1} & 1 & 0 & 0 & 0 & 0 & -u_1X_{w1} & -u_1Y_{w1} & -u_1Z_{w1} \\ 0 & 0 & 0 & 0 & X_{w1} & Y_{w1} & Z_{w1} & 1 & -v_1X_{w1} & -v_1Y_{w1} & -v_1Z_{w1} \\ X_w & Y_w & Z_w & 1 & 0 & 0 & 0 & 0 & -u_2X_{w2} & -u_2Y_{w2} & -u_2Z_{w2} \\ 0 & 0 & 0 & 0 & X_w & Y_w & Z_w & 1 & -v_2X_{w2} & -v_2Y_{w2} & -v_2Z_{w2} \\ & & & & & \vdots & & & & & \\ & & & & & \vdots & & & & & \\ X_w & Y_w & Z_w & 1 & 0 & 0 & 0 & 0 & -u_xX_{wx} & -u_xY_{wx} & -u_xZ_{wx} \\ 0 & 0 & 0 & 0 & X_w & Y_w & Z_w & 1 & -v_xX_{wx} & -v_xY_{wx} & -v_xZ_{wx} \end{bmatrix} \begin{bmatrix} h_{11} \\ h_{12} \\ h_{13} \\ h_{14} \\ h_{21} \\ h_{22} \\ h_{23} \\ h_{24} \\ h_{31} \\ h_{32} \\ h_{33} \end{bmatrix}. \quad (15)$$

Let $P=MH$ in the above equation, it may be deduced that $$H=(M^TM)^{-1}M^TP, \quad (16)$$

Wherein $$H_{3\times 4} = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix}$$

may be expressed by a combination of column vectors as $H_{3\times 4}=[h_1\ h_2\ h_3\ h_4]$, which may be deduced by equations (11) to (16).

From equation (11), $H_{3\times 4}=[h_1\ h_2\ h_3\ h_4]=sK[r_1\ r_2\ r_3\ t]$, wherein s is a proportion constant. Since $r_1, r_2, r_3$ are orthogonal matrixes, respectively, some limitation conditions for the nine intrinsic parameter matrixes K may be produced as: $h_1^TBh_1=1$, $h_2^TBh_2=1$, $h_3^TBh_3=1$, $h_1^TBh_2=0$, $h_1^TBh_3=0$, $h_2^TBh_3=0$, $h_3^TBh_2=0$, $h_3^TBh_1=0$, $B=K^{-T}K^{-1}$. The camera parameters may be deduced by $$B = K^{-T}K^{-1} \begin{bmatrix} B_{11} & B_{12} & B_{13} \\ B_{12} & B_{22} & B_{23} \\ B_{13} & B_{23} & B_{33} \end{bmatrix} = \begin{bmatrix} \frac{1}{f_x^2} & -\frac{f_s}{f_x^2 f_y} & \frac{v_0 f_s - u_0 f_y}{f_x^2 f_y} \\ -\frac{f_s}{f_x^2 f_y} & \frac{f_s^2}{f_x^2 f_y^2} + \frac{1}{f_y^2} & -\frac{f_s(v_0 f_s - u_0 f_y)}{f_x^2 f_y^2} - \frac{v_0}{f_y^2} \\ \frac{v_0 f_s - u_0 f_y}{f_x^2 f_y} & -\frac{f_s(v_0 f_s - u_0 f_y)}{f_x^2 f_y^2} - \frac{v_0}{f_y^2} & \frac{(v_0 f_s - u_0 f_y)^2}{f_x^2 f_y^2} + \frac{v_0^2}{f_y^2} + 1 \end{bmatrix}. \quad (17)$$

Finally, the deduced H and B may be used to deduce the intrinsic parameters and the extrinsic parameters for the image capturing device.

Intrinsic Parameters:

$$v_0 = \frac{(B_{12}B_{13} - B_{11}B_{23})}{(B_{11}B_{22} - B_{12}^2)}, f_x = \sqrt{\frac{s}{B_{11}}}, \quad (18)$$

$$s = \frac{B_{33} - [B_{13}^2 + v_0(B_{12}B_{13} - B_{11}B_{23})]}{B_{11}},$$

$$f_y = \sqrt{\frac{sB_{11}}{B_{11}B_{22} - B_{12}^2}},$$

-continued $$f_s = \frac{-B_{12}f_x^2 f_y}{s}, u_0 = \frac{f_s v_0}{f_x} - \frac{B_{13}f_s^2}{s}.$$

Extrinsic Parameters:

$$r_1=sK^{-1}h_1,\ r_2=sK^{-1}h_2,\ r_3=r_1\times r_2,\ t=sK^{-1}h_3. \quad (19)$$

As long as the calibration points around some local areas of the conical calibration object are taken for images, the intrinsic parameters and the extrinsic parameters may be deduced. This process may be applied onto a collection of holistic image information taken by a single or a plurality of cameras. As compared to the prior art, this process may avoid a shading effect on the calibration points. At the same time, a plurality of cameras overlapping to each other may be calibrated simultaneously to define an optimal measurement range of a concyclic' center.

Figure 6A:
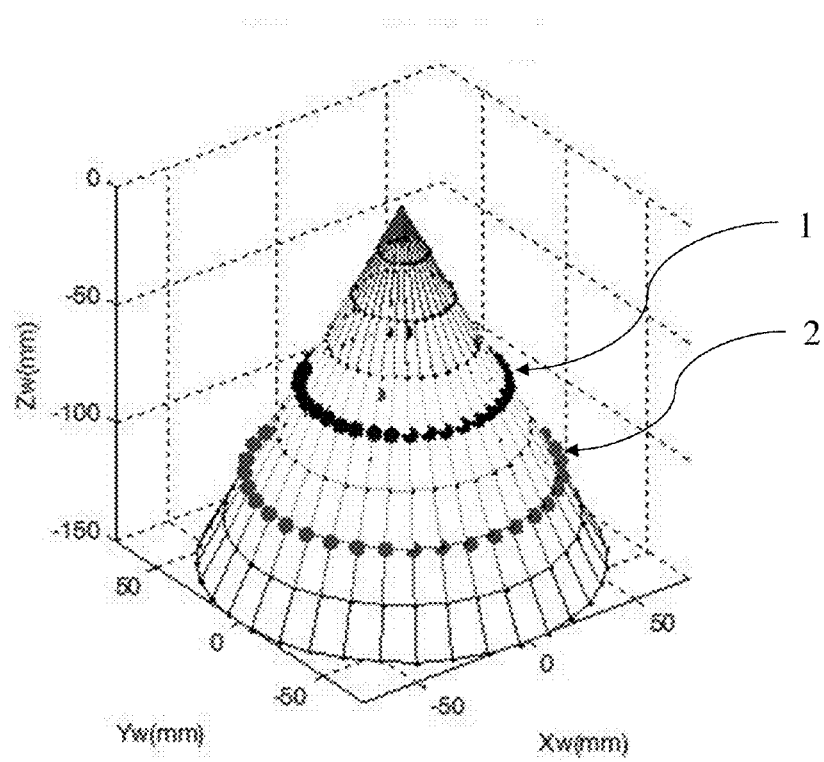
FIG. 6A and FIG. 6B are a side view and a vertical view of two different focal planes of a conical calibration object, respectively.
Figure 6B:
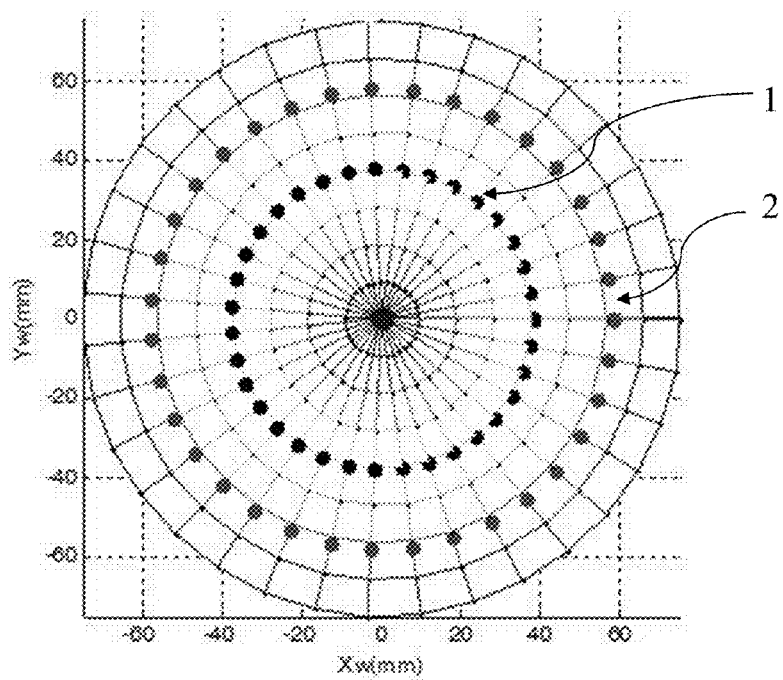
Figure 7A:
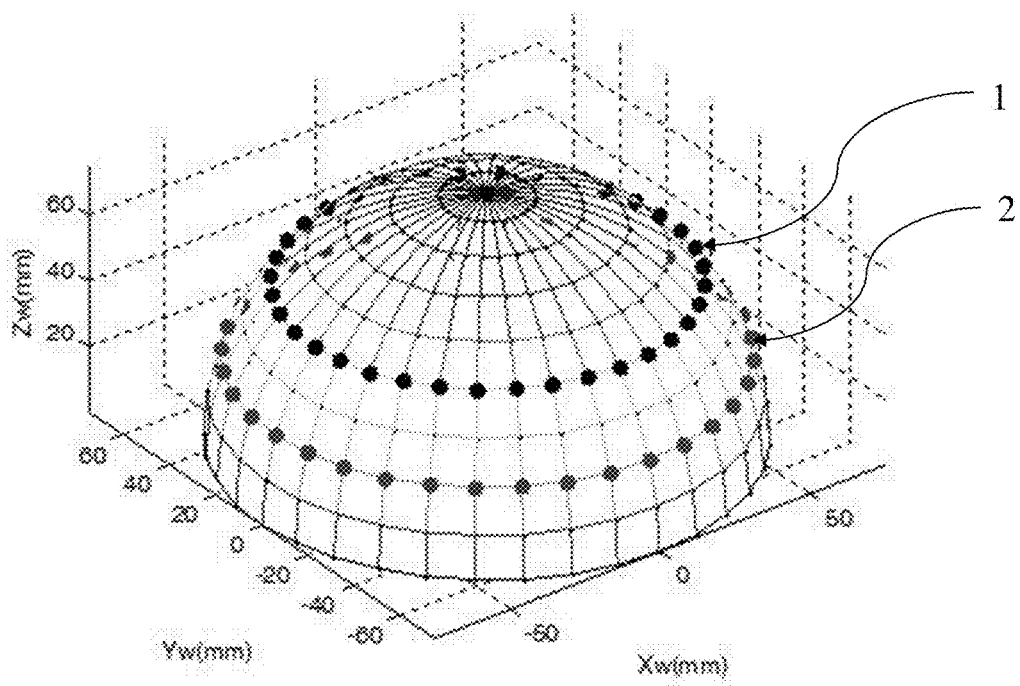
FIG. 7A and FIG. 7B are a side view and a vertical view of two different focal planes of a semi-circular calibration object, respectively.
Figure 7B:
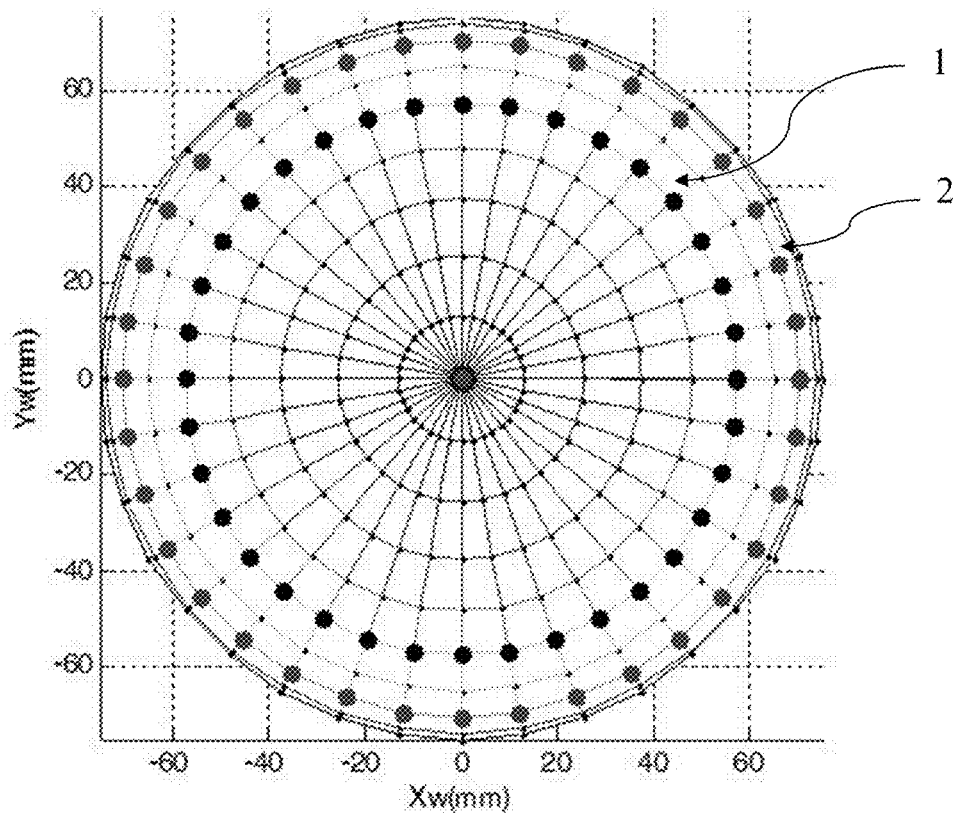
Figure 8A:
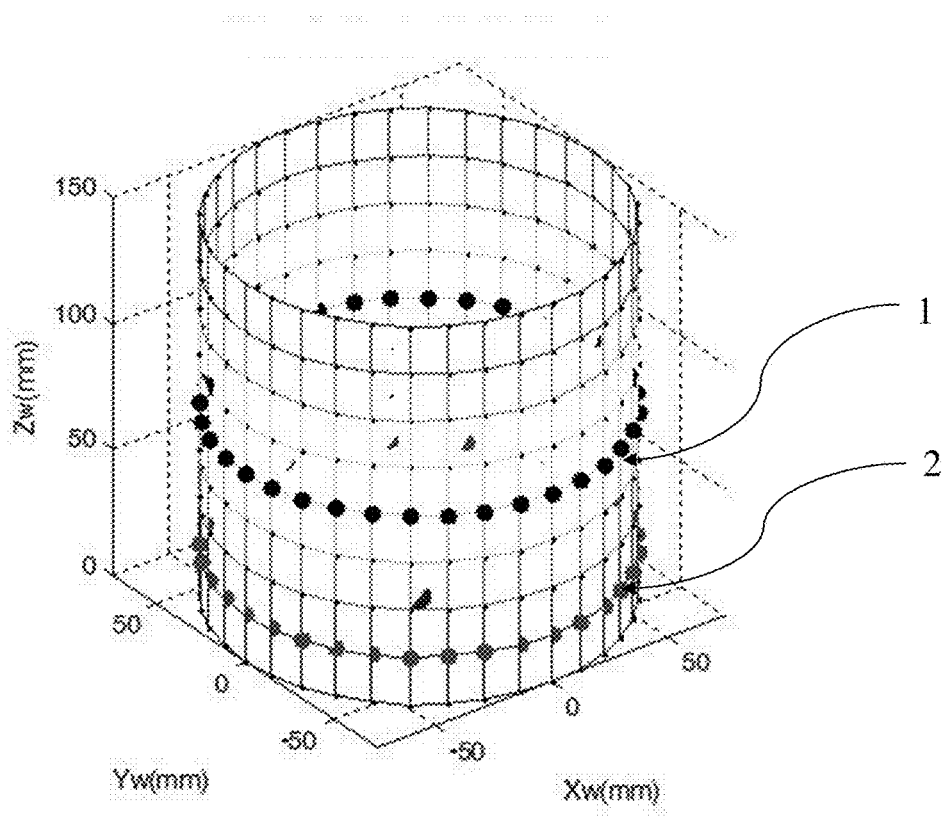
FIG. 8A and FIG. 8B are a side view and a vertical view of two different focal planes of a cylindrical calibration object, respectively.
Figure 8B:
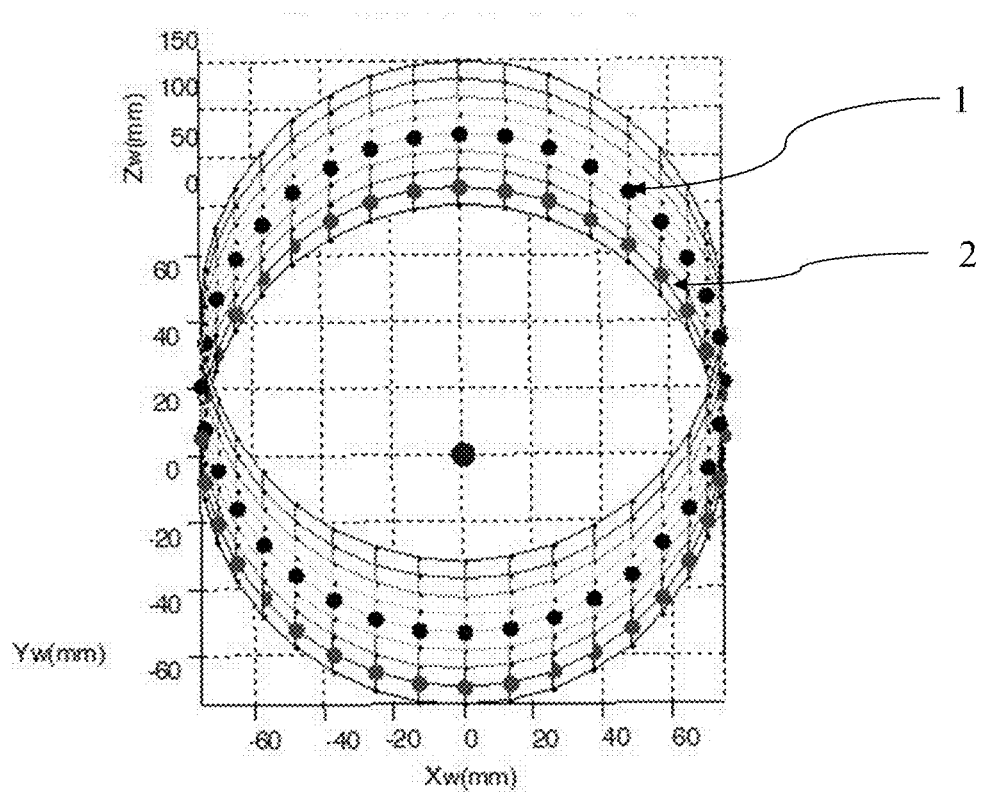

Viewed from FIG. 6A and FIG. 6B, which are a side view and a vertical view of two different focal planes of a conical calibration object, respectively, a systematic directionality of the camera with respect to an azimuth angle and a position of the planar calibration object is used to calibrate the camera parameters between the confocal arc surface 1 and the confocal arc surface 2. The confocal arc surface 1 and the confocal arc surface 2 are determined by choosing three points which are concyclic from calibration points. Range between the confocal arc surface 1 and the confocal arc surface 2 is defined a visible range of the camera.

The description for other semi-circular calibration object 20 and cylindrical calibration object 30 is similar to that for the conical calibration object 10, which are shown in FIG. 7A and FIG. 7B and FIG. 8A and FIG. 8B.

By using the technical means of the present invention, all the calibration points on the calibration object used for the image capturing devices may be successfully acquired for their images, so that the intrinsic and extrinsic parameters of the image capturing devices may be deduced, respectively, the technical issue encountered in the prior art may be effectively resolved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A conic section calibration object for calibrating an image capturing device, comprising:
    a conic section calibration object, having a set of coordination expressed by a polar coordination system, having different confocal arc surfaces, and being axisymmetric; and
    a plurality of calibration points, disposed on an outer surface of the conic section calibration object, and being selected from the polar coordination system each for a mapping relationship between a three dimensional target point in an image capturing device coordination system associated with the image capturing device and a two dimensional target image point corresponding thereto;
    wherein each confocal arc surface is determined by three calibration points which are concyclic, and at least six calibration points, which determines two of the different confocal arc surfaces, can be captured by the image capturing device when the image capturing device captures an image of the conic section calibration object, so that the image capturing device can be calibrated based on positions of the at least six calibration points and the range between the two of the different confocal arc surfaces in the image captured by the image capturing device.

2. The conic section calibration object for calibrating the image capturing device as claimed in claim 1, wherein the conic section calibration object includes a conical calibration object, a semi-circular calibration object, and a cylindrical calibration object.

3. The conic section calibration object for calibrating the image capturing device as claimed in claim 1, wherein the conic section calibration object is made of a hollow metallic material.

4. The conic section calibration object for calibrating the image capturing device as claimed in claim 2, wherein the conical calibration object includes a circular calibration object, an elliptical calibration object, a parabolic calibration object, and a hyperbola calibration object.

5. The conic section calibration object for calibrating the image capturing device as claimed in claim 2, wherein the conical calibration object and the semi-circular calibration object each express the plurality calibration points on the conical calibration object and the semi-circular calibration object by using the following coordination relationship:

$$r=\sqrt{x^2+y^2},\ \theta=\tan^{-1}y/x \quad (1)$$

$$x=r\cos\theta,\ y=r\sin\theta,\ \text{and} \quad (2)$$

$$x=r\sin\theta\cos\phi\ r=\sqrt{x^2+y^2+z^2}$$

$$y=r\sin\theta\sin\phi,\ \theta=\cos^{-1}z/r \quad (3)$$

$$z=r\cos\theta\ \phi=\tan^{-1}y/x$$

wherein x, y, and z are each a coordination value in a Cartesian coordination system, respectively, r and θ are each a coordination value in the polar coordination system, respectively, while φ is an azimuth angle.

6. The conic section calibration object for calibrating the image capturing device as claimed in claim 2, wherein the cylindrical calibration object each express the plurality calibration points on the cylindrical calibration object by using the following coordination relationship:

$$r=\sqrt{x^2+y^2},\ \theta=\tan^{-1}y/x \quad (1)$$

$$x=r\cos\theta,\ y=r\sin\theta,\ \text{and} \quad (2)$$

$$x=r\cos\phi\ r=\sqrt{x^2+y^2}$$

$$y=r\sin\phi,\ \phi=\tan^{-1}y/x \quad (3)$$

$$z=z\ z=z$$

wherein x, y, and z are each a coordination value in a Cartesian coordination system, respectively, r and θ are each a coordination value in the polar coordination system, while φ is an azimuth angle and z is also an altitude.

7. A conic section calibration object for calibrating an image capturing device, comprising:
    a conic section calibration object, having a set of coordination expressed by a polar coordination system, and are selected from a group consisting of a conical calibration object, a semi-circular calibration object, and a cylindrical calibration object, having different confocal arc surfaces, and being axisymmetric; and
    a plurality of calibration points, disposed on an outer surface of the conic section calibration object, and being selected from the polar coordination system each for a mapping relationship between a three dimensional target point in an image capturing device coordination system associated with the image capturing device and a two dimensional target image point corresponding thereto, wherein each confocal arc surface is determined by three calibration points which are concyclic, and at least six calibration points, which determines two of the different confocal arc surfaces, can be captured by the image capturing device when the image capturing device captures an image of the conic section calibration object, so that the image capturing device can be calibrated based on positions of the at least six calibration points and the range between the two of the different confocal arc surfaces in the image captured by the image capturing device.

8. The conic section calibration object for calibrating the image capturing device as claimed in claim 7, wherein the conic section calibration object is made of a hollow metallic material.

9. The conic section calibration object for calibrating the image capturing device as claimed in claim 7, wherein the conical calibration object includes a circular calibration object, an elliptical calibration object, a parabolic calibration object, and a hyperbola calibration object.

10. The conic section calibration object for calibrating the image capturing device as claimed in claim 7, wherein the conical calibration object and the semi-circular calibration object each express the plurality calibration points on the conical calibration object and the semi-circular calibration object by using the following coordination relationship:

$$r=\sqrt{x^2+y^2},\ \theta=\tan^{-1}y/x \quad (1)$$

$$x=r\cos\theta,\ y=r\sin\theta,\text{ and} \quad (2)$$

$$x=r\sin\theta\cos\phi\ r=\sqrt{x^2+y^2+z^2}$$

$$y=r\sin\theta\sin\phi,\ \theta=\cos^{-1}z/r \quad (3)$$

$$z=r\cos\theta\ \phi=\tan^{-1}y/x$$

wherein x, y, and z are each a coordination value in a Cartesian coordination system, respectively, r and θ are each a coordination value in the polar coordination system, respectively, while φ is an azimuth angle.

11. The conic section calibration object for calibrating the image capturing device as claimed in claim 7, wherein the cylindrical calibration object expresses the plurality calibration points on the cylindrical calibration object by using the following coordination relationship:

$$r=\sqrt{x^2+y^2},\ \theta=\tan^{-1}y/x \quad (1)$$

$$x=r\cos\theta,\ y=r\sin\theta,\text{ and} \quad (2)$$

$$x=r\cos\phi\ r=\sqrt{x^2+y^2}$$

$$y=r\sin\phi,\ \phi=\tan^{-1}y/x \quad (3)$$

$$z=z\ z=z$$

wherein x, y, and z are each a coordination value in a Cartesian coordination system, respectively, r and θ are each a coordination value in the polar coordination system, respectively, while φ is an azimuth angle and z is also an altitude.

12. The conic section object for calibrating the image capturing device as claimed in claim 7, wherein choosing three points which are concyclic from calibration points to determine two confocal arc surface, range between two confocal arc surface is defined a visible range of am image capturing device.

* * * * *